(12) United States Patent
Martin et al.

(10) Patent No.: US 8,584,039 B2
(45) Date of Patent: Nov. 12, 2013

(54) METHOD OF SELECTING AN ELEMENT FROM A LIST BY MOVING A GRAPHICS DISTINCTION AND APPARATUS IMPLEMENTING THE METHOD

(75) Inventors: Jérôme Martin, Paris (FR); Hervé Dartigues, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 207 days.

(21) Appl. No.: 11/323,623

(22) Filed: Dec. 30, 2005

(65) Prior Publication Data

US 2006/0174295 A1 Aug. 3, 2006

(30) Foreign Application Priority Data

Jan. 6, 2005 (FR) .................................. 05 50055

(51) Int. Cl.
*G06F 3/048* (2006.01)
(52) U.S. Cl.
USPC ......................................................... 715/810
(58) Field of Classification Search
USPC .................. 715/785, 811, 862, 829–830, 833
See application file for complete search history.

(56) References Cited

U.S. PATENT DOCUMENTS

| | | | |
|---|---|---|---|
| 5,436,637 A | 7/1995 | Gayraud et al. | |
| 5,565,888 A | 10/1996 | Selker | |
| 5,677,708 A | 10/1997 | Matthews, III et al. | |
| 5,805,235 A * | 9/1998 | Bedard ........................... | 725/38 |
| 5,923,861 A * | 7/1999 | Bertram et al. ............... | 715/786 |
| 6,046,684 A * | 4/2000 | Hamersley et al. ........ | 340/12.55 |
| 6,057,831 A | 5/2000 | Harms et al. | |
| 6,188,406 B1 * | 2/2001 | Fong et al. ..................... | 715/810 |
| 6,907,575 B2 * | 6/2005 | Duarte .......................... | 715/784 |
| 7,380,260 B1 * | 5/2008 | Billmaier et al. ............... | 725/37 |
| 2002/0171690 A1 | 11/2002 | Fox et al. | |
| 2003/0043207 A1 | 3/2003 | Duarte | |
| 2003/0169286 A1 | 9/2003 | Misawa | |
| 2004/0036779 A1 * | 2/2004 | Cazier et al. ............... | 348/231.2 |
| 2004/0100479 A1 * | 5/2004 | Nakano et al. ................ | 345/700 |

FOREIGN PATENT DOCUMENTS

| | | |
|---|---|---|
| EP | 1 251 515 A1 | 10/2002 |
| FR | 2 805 698 A1 | 2/2000 |
| GB | 2 323 489 A | 9/1998 |
| JP | 2004179870 | 6/2004 |
| WO | WO02091160 | 11/2002 |

OTHER PUBLICATIONS

Search Report Dated May 23, 2005.

* cited by examiner

*Primary Examiner* — Sara England
(74) *Attorney, Agent, or Firm* — Myers Wolin, LLC

(57) ABSTRACT

The invention makes it possible to select an element from a list of elements represented by icons. A first element is selected by affixing a graphics distinction on its icon. When the user activates and holds a command, said graphics distinction moves from the first icon to a second icon. A second element is selected when the graphics distinction occupies at least one determined area of the second icon representing this second element. According to an improvement, the graphics distinction moves from icon to icon, totally overlapping only a single icon at a time.

The invention also relates to a device able to execute the method of selecting an element by moving a graphics distinction.

9 Claims, 4 Drawing Sheets

METHOD OF SELECTING AN ELEMENT FROM A LIST BY MOVING A GRAPHICS DISTINCTION AND APPARATUS IMPLEMENTING THE METHOD

FIELD OF THE INVENTION

The invention relates to a method of selecting icons displayed in a bar on a display screen and to a device furnished with a user interface using the method.

BACKGROUND

A user interface generally uses descriptive data to formulate menus apt to be displayed on a television screen. Among other things, these data allow the user to filter audiovisual contents and to choose the one of interest to him. A graphics interface makes it possible to navigate among these contents and to act on these contents. The MPEG-7 standard specifies descriptive data associated with audiovisual contents. The MPEG-7 standard is distributed by the ISO under the reference ISO/IEC JTC1/SC29WG11-N5525 published in March 2003. If these contents are received from a transmission network, the descriptive data are stored in a local data base and constantly updated as a function of the contents transmitted by the network. Other descriptive data exist, also read from media such as CDs or DVDs. In a general manner, the descriptive data are recorded in a data base of the memory of a receiver, and grouped together according to certain criteria such as: topic, language, morality rating, etc.

The operations of interaction with a user are generally performed with the aid of an Electronic Program Guide (EPG) displayed on the screen. The EPG utilizes the data recorded and presents them on the screen. The user navigates through the data displayed with the aid of the navigation keys disposed on a remote control. A particularly simple way of navigating consists in displaying a bargraph of horizontally disposed buttons and of graphically highlighting a button of the bar. The activation of the "right arrow" or "left arrow" keys moves the button highlighted, the pressing of an "ENTER" key triggers the activation of the element selected. If the bar represents commands, the user can execute the command associated with the button highlighted. The user can also select attributes of descriptive data so as to formulate lists of documents, then choose a document from the list displayed and download it so as to view it.

Such user interfaces must use numerous keys for navigation and selection of the elements displayed. The remote controls are therefore expensive and not very aesthetic. It is known to use remote controls furnished with a single button. Patent application WO02/091160 filed by the company TELENOSTRA describes a button installable on a remote control of an audiovisual device. This button has seven movements of freedom (depressed, right, left, up, down, rotated right, rotated left) allowing a user to introduce at most seven different commands. The screen displays the symbol of each of the movements of freedom by associating it with a function in such a way that the user knows which movement to activate in order to instigate the associated function. The mechanics of such a button are however complex and the cost of its integration into a remote control is significant.

Document U.S. Pat. No. 6,057,831—SAMSUNG describes a menu making it possible to select a channel from within a large list of channels. Part of the list only is displayed while explicitly indicating the names of the channels. A graphics bar representing the whole list of channels is displayed as screen background, a cursor placed on the bar indicates whereabouts the part displayed is located. The user's commands scroll the list of channels.

Document U.S. Pat. No. 5,436,637—GAYRAUD describes a menu comprising icons constituting horizontal bars. An arrow-shaped cursor makes it possible to select each icon. The user uses a mouse to move the cursor. The cursor being smaller than the icons, the user can readily place it on the desired icon so as to select it.

Document U.S. Pat. No. 5,805,235—BEDARD describes menus comprising icons presented in the form of horizontal bars. A graphics distinction surrounds the icon selected. The user can move the focus with the aid of the direction keys of his remote control.

Document FR 2 805 698—THOMSON published on 31 Aug. 2001, describes a procedure for selecting a program from a list. The titles of the programs scroll through a fixed window of the screen. Pressing a key triggers the activation of the program highlighted or stops the scrolling.

The present invention presents a novel manner of selecting an element from a graphics menu, which is easy to implement, with limited and inexpensive means of navigation.

SUMMARY OF THE INVENTION

The subject of the invention is a method of selecting elements represented by icons forming an ordered series of icons appearing on a screen, comprising a step of selecting a first element by superposition of a graphics distinction applied to a first icon representing this first element;
wherein it comprises:
a step of moving the graphics distinction towards a second icon triggered by the introduction and the holding of an action introduced by the user,
a step of selecting the second element represented by said second icon as soon as the graphics distinction occupies at least one determined area of the second icon.

In this way the user can easily select several elements such as functions, using just a single means of command introduction. The association between the menu displayed and a multifunction key of a remote control affords undeniable commercial benefit to users.

A first improvement consists in the fact that the graphics distinction moves from icon to icon, totally overlapping only a single icon at a time. In this way, the user very quickly perceives that the icon selected at a given moment is the one whose surface is most covered by the graphics distinction. There is therefore no ambiguity in the selection. An improvement consists in the fact that, when the graphics distinction reaches an intermediate position between two icons, its movement accelerates so that this position during which it is hard for the user to determine the icon selected, lasts for as little time as possible.

A variant consists in the fact that the first icon preserves the graphics distinction which extends in the course of the movement step over the other icons. In this way, the user sees at once the direction in which the movement of the graphics distinction takes place and deduces there from the elements that will soon be selected and that he will be able to activate. A improvement consists in displaying an identifier of the second element when the graphics distinction occupies a determined area of the icon representing this second element. In this way, at any moment the user sees which element is selected.

According to another improvement, the most commonly used elements are associated with the first icons of the ordered series. In this way, they will be selected more rapidly during the step of movement of the graphics distinction. According to another improvement, the icons are rectangular buttons, the ordered series being represented by a bar displayed on the screen. According to another improvement, the elements represented by icons are commands applied to the document displayed as screen background. The method then comprises a step of executing the command whose icon is highlighted by the graphics distinction, execution being instigated by the introduction of an action of the user. In this way, the user can rapidly act on the displaying of the document undergoing reproduction.

According to another improvement, all the actions introduced by the user are performed on one and the same key, built for example into the remote control associated with the device.

The invention also relates to an electronic device comprising a means of display of a series of icons representing elements, a means of generation of a graphics distinction applied to a first icon representing a first element, a means of introducing an action of a user; wherein the means of generation of a graphics distinction moves said graphics distinction from the first icon to a second icon, the movement being activated upon the introduction of a first action on the introduction means, and a means of selection of a second element represented by the second icon when the graphics distinction is applied to a determined area at least of the second icon.

BRIEF DESCRIPTION OF THE DRAWINGS

Other characteristics and advantages of the invention will now become apparent with greater detail within the framework of the description which follows of exemplary embodiments given by way of illustration while referring to the appended figures which represent.

DETAILED DESCRIPTION

Figure 1:
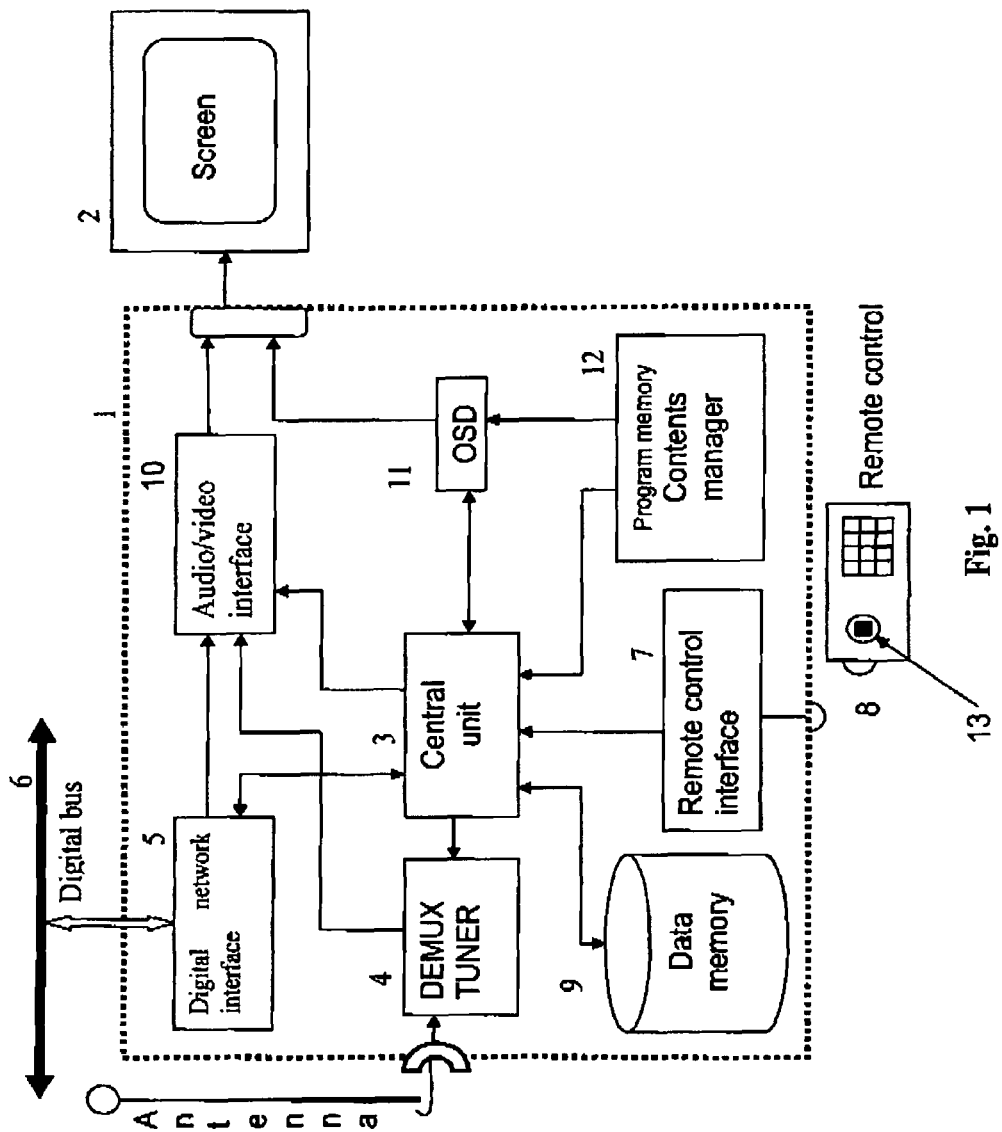
FIG. 1 is a block diagram of a multimedia receiver for the implementation of an exemplary embodiment of the invention.

The structure of a multimedia receiver 1 furnished with a display device 2 according to an exemplary embodiment of the invention will firstly be described. Described here is a decoder but other devices are also useable for the present invention, for example a personal computer or a PVR, or any device capable of accessing audiovisual contents and having means of creating and displaying menus. The receiver comprises a central unit 3 linked to a program memory 12, and an interface 5 for communicating with a high bit rate digital bus 6 making it possible to transmit audio/video data in real time. This network is preferably public and makes it possible to access remote servers, the commonest is the IP network. The receiver can also receive audio/video data from a transmission network through a reception antenna associated with a demodulator 4. The receiver furthermore comprises an infrared signal receiver 7 for receiving the signals of a remote control 8, a memory 9 for storing audiovisual contents and a data base, and audio/video decoding logic 10 for generating the audiovisual signals despatched to the television screen 2. The remote control is fitted with a main key 13, the various associated functions of which we shall see later, "SELECT" and "DIRECTION" keys, and possibly a numerical pad for value introduction. The memory 9 is advantageously a hard disk of several hundred megabytes, making it possible to record several hours at least of audiovisual contents. These audiovisual contents are identified by a title recorded in the data base.

The receiver also comprises a circuit 11 for displaying data on the screen, often called an OSD circuit, standing for "On Screen Display". The OSD circuit 11 is a text and graphic generator which makes it possible to screen menus, pictograms (for example, a number corresponding to the station displayed) and which makes it possible to display the navigation menus in accordance with the present invention, and in particular one or more bargraphs. The OSD circuit 11 is controlled by the Central Unit 3 and the contents manager 12. The contents manager 12 is advantageously embodied in the form of a program module recorded in a read only memory. It may also be embodied in the form of a special purpose circuit of ASIC type for example.

The digital bus 6 and/or the transmission network send the receiver data comprising multimedia contents and data descriptive of these contents. These data originate either from a transmission network, or from the digital network 6. The descriptive data comprise elements called "attributes" for classifying accessible multimedia contents. The descriptive data are for example metadata defined according to the MPEG7 standard. These data are stored in the data base of the memory 9 of the receiver and are continually updated. The contents manager 12 extracts the information from this data base and processes the former so as to produce navigation menus displayed on the screen, in particular one or more bargraphs.

Figure 2:
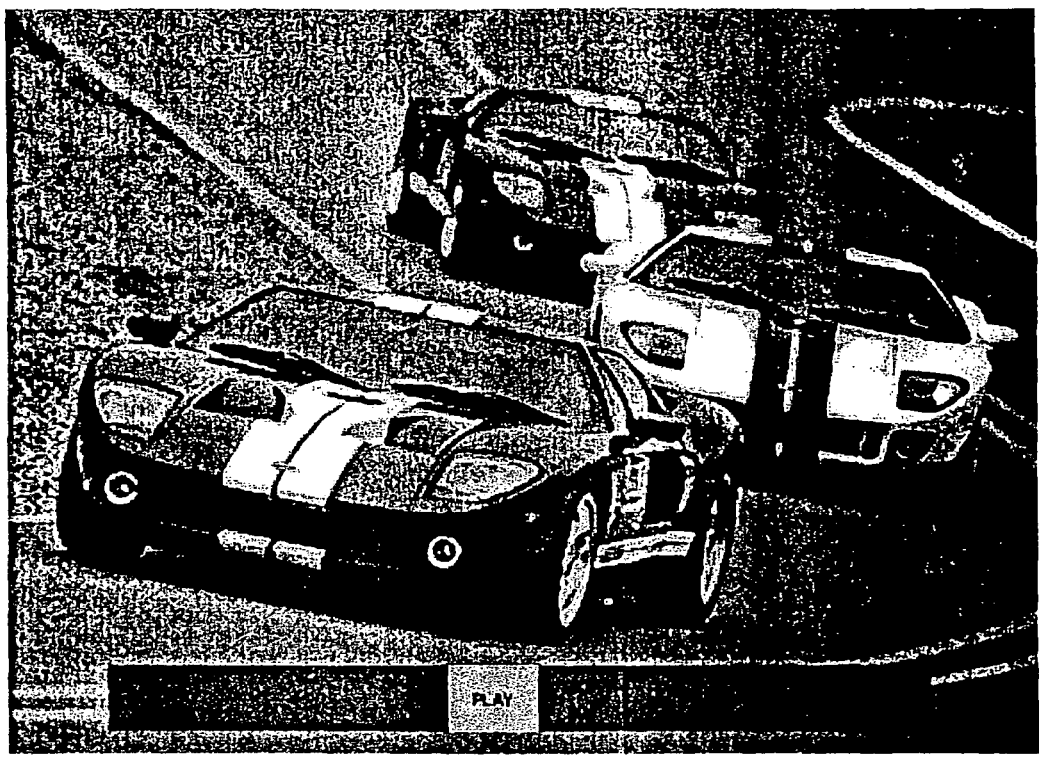
FIG. 2 presents an example of a screen shot comprising a bargraph of buttons, each button representing a command executable by pressing the main key of a remote control.

According to a preferred exemplary embodiment, the contents manager 12 displays a bargraph representing a list of functions applicable to the audiovisual contents and that is accessible by the receiver 1. This bargraph is displayed superimposed on the video content previously selected by the user and which is displayed as screen background. FIG. 2 shows a screen shot with a video content as screen background and a bargraph representing commands at the bottom of the screen. In the example of FIG. 2, the device 1 reproduces a content recorded in the memory 9. A first press of the main key 13 of the remote control brings up the bargraph. This bar consists of buttons each containing an identifier of the various commands available. The first button indicates the state of the receiver, in this instance it indicates "PLAY" which signifies that the document is currently being read, the second button represents the "SKIP 30s" command which in a single go makes it possible to advance by 30 seconds ahead in the reading, the third button represents the command making it possible to read the content at a speed multiplied by 3, the fourth button represents the command making it possible to read the content at a speed multiplied by 6, the fifth button represents the command making it possible to read the content at a speed multiplied by 15 and the sixth and last button represents the command making it possible to read the content at a speed multiplied by 30. Advantageously, the most commonly used commands are placed in the buttons at the start of the bar, on the left side. Advantageously, each button contains an identifier of the command associated with this button.

Figure 3:
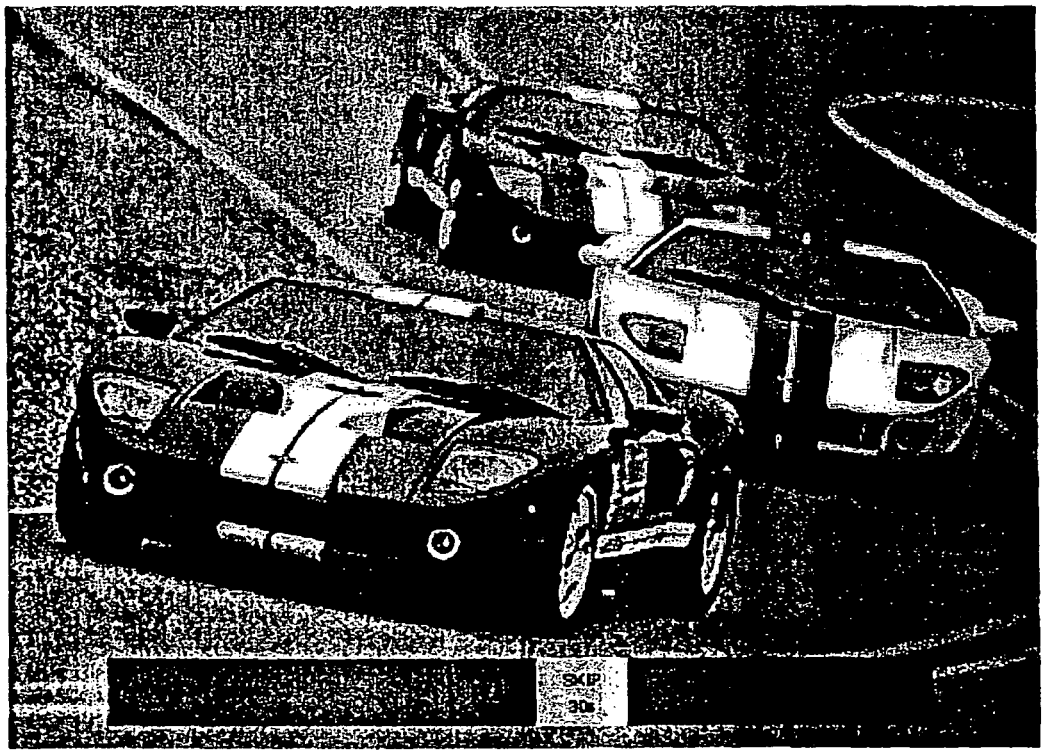
FIG. 3 presents another example of a screen shot comprising the bargraph of FIG. 2 after pressing the main key of the remote control, FIG. 4 present seven details of screen shots showing the progression of the graphics bar according to a preferred exemplary embodiment, FIG. 5 present seven details of screen shots showing the progression of the graphics bar according to another exemplary embodiment.

According to a preferred exemplary embodiment, a button is graphically highlighted. In FIGS. 2, 3, 4 and 5, the highlighting is performed by applying a graphics distinction to all or part of one or several buttons. According to a preferred embodiment, the graphics distinction consists in changing the colour of the zone of application or in accentuating the colour. A variant consists in rendering the buttons transparent, marking only the outlines, and in presenting opaque the zone of application of the graphics distinction. Another variant consists in causing the zone of application of the graphics distinction to flash. When displaying the bar, the leftmost button is graphically highlighted. If the user presses the main key 13, then the graphics distinction moves slowly to the second button identified "SKIP". FIG. 3 presents a shot of the screen at the end of the movement. In this way, the user sees that by holding the key 13 depressed, the graphics distinction moves to the other buttons, and intuitively, he realizes that he will be able to select the other buttons in this way.

Let us assume that the time for moving the graphics distinction from "PLAY" to "SKIP" is 2 seconds. If the user holds the key depressed for more than the 2 seconds, this signifies that he has understood that by holding the key depressed, he selects the other buttons. There is therefore no longer any need to show him this teaching for longer, according to a preferred embodiment, the skips beyond the "SKIP" button are performed from button to button abruptly. A variant consists in continuing to move the graphics distinction in a continuous manner, until the last button of the bar is reached. In all cases, when the last button is reached the movement stops even if the key is depressed. The bar must be made to disappear in order that, on its reappearance, the first button is again selected.

FIG. 4 show the progression of the graphics bar as a function of the holding of the prolonged action on the main key. By looking at the seven FIGS. 4a to 4f, the user sees the progression of the graphics distinction applied to the buttons of the bar when he holds the key 13 depressed. At the start (instant T0—FIG. 4a), the first button of the graphics bar is highlighted. The user presses the key 13 and keeps it depressed. At the instant T1, a second for example, the bar looks like FIG. 4b, the graphics distinction is of reduced size and is located in part on the "SKIP" button. The user thus notes that by holding the key depressed, a rightward movement of the graphics distinction represented by the cursor takes place. He then deduces there from that by prolonging the holding of the key, the graphics distinction will continue to the right and thus he will be able to select the buttons which are located in this direction. At the instant T2 corresponding to FIG. 4c, the graphics distinction increases in size and occupies half of the area of the button of the second command "SKIP". At the instant T3, the bar looks like FIG. 4d, the graphics distinction occupies the entire area of the button identified "SKIP". At this moment, the user releases the key 13, the content manager then reverses the direction of movement of the graphics distinction.

If at this moment the user wishes to instigate the execution of the command associated with the button selected, he presses the "SELECT" key. According to the example above, the command: "SKIP" is executed. A variant consists in not using other buttons, in this case the user instigates the execution by releasing the key and pressing thereon immediately.

Figure 4A:
Figure 4B:
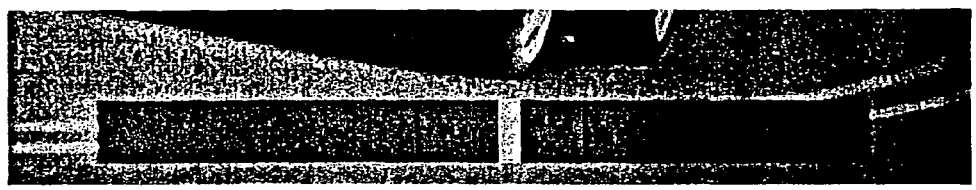
Figure 4C:
Figure 4D:
Figure 4E:
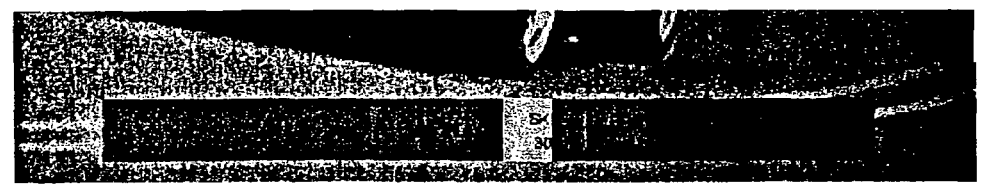
Figure 4F:
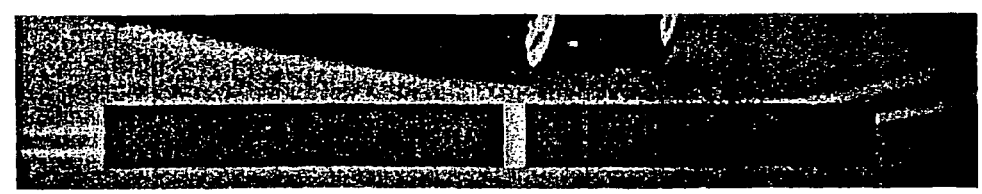
Figure 4G:
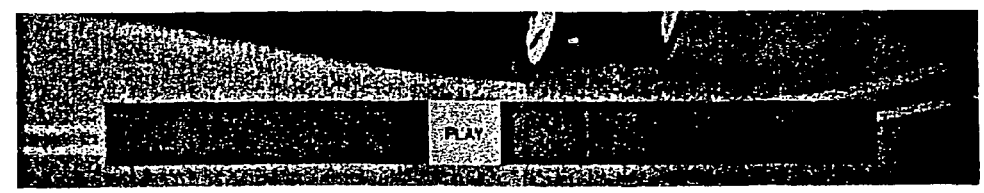

Let us assume that the user simply releases the key 13, this being the instant T4, the bar looks like FIG. 4e, the size of the graphics distinction decreases on the right thus showing the user the new direction of movement. At the instant T5 corresponding to FIG. 4f, the graphics distinction is again of reduced size and lies in part on the first and second buttons identified "PLAY" and "SKIP". At the instant T6 corresponding to FIG. 4g, the graphics distinction again occupies the entire area of the "PLAY" button, thus showing the user the state of the receiver. The movement then stops and after three seconds, the bargraph disappears.

According to a improvement, when, in its rightward movement, the graphics distinction is close to the position midway between two buttons, the movement is accelerated so that the moment at which the graphics distinction applies equally to two buttons is as brief as possible. In this way, the passage from one button to another is clearer for the user.

FIGS. 4a-4g show an exemplary embodiment in which the graphics distinction is a window of invariable dimension sliding from button to button from left to right. This sliding appearing as soon as the button is held shows the user its effect. As a variant, FIGS. 5a-5g present another way of showing the effect of holding the key depressed, according to this variant, the graphics distinction possesses a variable dimension. Advantageously, here the graphics distinction looks like a sheet of colour which extends over the various buttons.

Figure 5A:
Figure 5B:
Figure 5C:
Figure 5D:

At the start (FIG. 5a), the first button of the graphics bar is graphically highlighted, taking the colour of the colour sheet. As soon as the user presses the key and holds it depressed, the colour sheet extends towards the right and begins to occupy the second button (FIG. 5b). At the beginning, the identifiers of the first button and of the second button remain displayed. As shown by FIG. 5c, when the colour of the first button occupies more than around half of the second button, the identifier of the first button disappears and the identifier of the second button is placed in the middle of the highlighting graphics distinction. In this way, at any moment the user sees the command that he can select and execute.

Figure 5E:
Figure 5F:
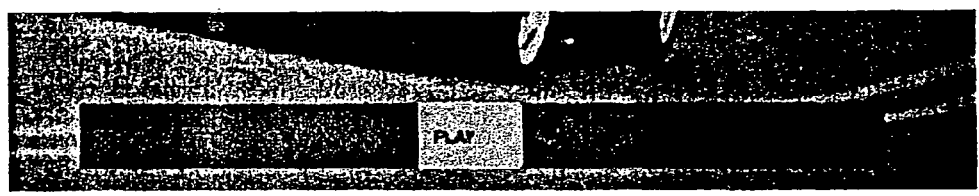
Figure 5G:
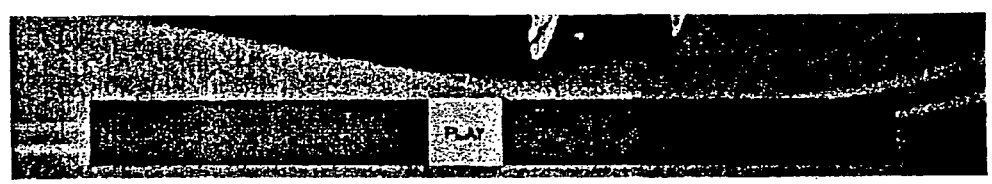

If the user prolongs the press, the graphics distinction is gradually affixed to all the buttons. Let us assume that the user wishes to return to a previous command, he releases the key 13 of the remote control. Immediately, the direction of movement of the graphics distinction reverses. FIGS. 5e, 5f and 5g show a return to the starting situation. At the end, the graphics distinction is affixed solely to the button identified "PLAY". After a few seconds and without the key being pressed again, the bargraph disappears.

According to another improvement, when, in its rightward enlargement or its leftward reduction, the graphics distinction reaches the position midway between two buttons, the movement is accelerated so that the moment in the course of which the graphics distinction overlaps the two elements equally is as brief as possible. In the course of this moment, the identifier of the element selected by the graphics distinction disappears. In this way the ambiguity in the command selected lasts for the least possible time.

In the first two variants, the graphics distinction is always in motion. A third variant consists in making provision to freeze its movement. According to this variant, the releasing of the key 13 freezes the movement of the bargraph. If the user does nothing, the bar remains displayed for a certain time, 10 seconds for example and then disappears. If the user presses once and releases immediately, then the command currently highlighted graphically is executed. If the user presses once, releases immediately, and presses a second time while holding the key 13 depressed, then the direction of movement of the graphics distinction reverses.

According to another variant of this last variant, the reversal of direction is performed by another key labelled "DIRECTION". Advantageously, a "→" or "←" icon is displayed at the tip of the bar so as to show the direction of the movement in progress.

According to the above examples, the graphics bar is composed of buttons of rectangular shape. These examples in no way exclude the possibility that the graphics elements of which the bar is composed may reproduce other shapes such as circles, pentagons, cylinders, etc. Likewise, the graphics bar described above in a linear fashion may be represented curved, or else in the form of a broken line. The graphics elements associated with commands may also be associated with elements of a set such as audiovisual documents, display options, user names, etc. Preferably, these elements are ordered according to their importance, the most important being highlighted graphically first. Likewise, the movement of the graphics distinction may be performed in any direction whatsoever.

Although the present invention has been described with reference to the particular embodiments illustrated, it is in no way limited by these embodiments, but is so only by the appended claims. It will be noted that other changes or modifications may be made by the person skilled in the art to the embodiments described above, without thereby departing from the scope of the present invention.

The invention claimed is:

1. A method of selecting elements represented by icons forming an ordered series of icons appearing on a screen, comprising
   selecting a first element by superposition of a graphics distinction applied to a first icon representing this first element;
   wherein said method further comprises:
      moving the graphics distinction towards at least a second icon triggered by a pressing and holding of a key by the user, the pressing specifying at least a single direction, the first icon preserving the graphics distinction which extends over the other icons in the specified single direction of the movement, the dimension of the graphics distinction being variable during the holding of the key by the user,
      selecting a single second element represented by said second icon as soon as the graphics distinction occupies at least one determined area of said second icon,
      executing a single command associated with the single second element represented by said second icon, and
      upon releasing of the holding of the same key by the user, starting reversing the direction of movement of the graphic distinction, such that the graphics distinction recedes from the other icons in the reversed direction until the graphic distinction is only on the first icon.

2. The method of selecting elements according to claim 1; wherein said method further comprises:
   accelerating the movement of the graphics distinction when the latter reaches an intermediate position between two icons.

3. The method of selecting elements according to claim 1; wherein said method further comprises:
   displaying an identifier of the second element when the graphics distinction occupies a determined area of the icon representing said second element.

4. The method of selecting elements according to claim 1; wherein the most commonly used elements are associated with the first icons of the ordered series.

5. The method of selecting elements according to claim 1; wherein the elements are commands applied to the document displayed as screen background, and
   the single command associated with the single second element represented by the second icon being executed subsequent to the introduction of a pressing of another key by the user.

6. An electronic device comprising:
   a screen for displaying a series of icons representing elements,
   an on screen display circuit for generating a graphics distinction applied to a first icon representing a first element,
   a remote control unit including at least one key for introducing an action of a user;
   wherein the on screen display circuit holds the graphics distinction on the first icon and extends the graphics distinction over at least one other second icon in a specified single direction of a movement, the movement being activated upon a pressing and holding of a key on the remote control unit, the pressing specifying at least the single direction of the movement, the dimension of the graphics distinction being variable during the holding of the key by the user,
   a control button for selecting a single second element represented by the second icon when the graphics distinction is applied to a determined area at least of the second icon, and
   a central unit for executing a single command associated with the single second element represented by said second icon,
   wherein the on screen display circuit starts, upon releasing of the holding of the same key by the user, reversing the direction of movement of the graphic distinction, such that the graphics distinction recedes from the other icons in the reversed direction until the graphic distinction is only on the first icon.

7. The electronic device according to claim 6; wherein the on screen display circuit accelerates the movement of the graphics distinction when the latter reaches an intermediate position between two icons.

8. The electronic device according to claim 6; wherein the on screen display circuit displays an identifier of the second element when the graphics distinction occupies a determined area of the icon representing said second element.

9. The electronic device according to claim 6; wherein the elements are commands applied to the document displayed as screen background, and
   the single command associated with the single second element represented by the second icon is executed subsequent to the introduction of a pressing of another key on the remote control unit.

* * * * *